(12) United States Patent
Kleyman et al.

(10) Patent No.: US 8,599,687 B1
(45) Date of Patent: Dec. 3, 2013

(54) SCALABLE ARCHITECTURE FOR DEEP-PACKET PROCESSING

(75) Inventors: Alexander Kleyman, Danville, CA (US); Ted Fried, Pleasanton, CA (US)

(73) Assignee: Bivio Networks, Inc., Pleasanton, CA (US)

( * ) Notice: Subject to any disclaimer, the term of this patent is extended or adjusted under 35 U.S.C. 154(b) by 141 days.

(21) Appl. No.: 13/186,408

(22) Filed: Jul. 19, 2011

Related U.S. Application Data (63) Continuation of application No. 11/837,089, filed on Aug. 10, 2007, now Pat. No. 8,005,101.

(60) Provisional application No. 60/822,008, filed on Aug. 10, 2006.

(51) Int. Cl.
*H04J 1/16* (2006.01)

(52) U.S. Cl.
USPC ............ 370/230; 709/220; 709/221; 709/222

(58) Field of Classification Search
USPC ........... 709/220–222, 246; 370/230, 389, 392
See application file for complete search history.

(56) References Cited

U.S. PATENT DOCUMENTS

| | | | |
|---|---|---|---|
| 5,287,531 A | | 2/1994 | Rogers et al. |
| 5,367,678 A | * | 11/1994 | Lee et al. ...................... 718/104 |
| 5,506,969 A | | 4/1996 | Wall et al. |
| 6,321,181 B1 | | 11/2001 | Havens |
| 6,845,456 B1 | | 1/2005 | Menezes et al. |
| 6,901,522 B2 | | 5/2005 | Buch |
| 7,296,182 B2 | | 11/2007 | Greenspan et al. |
| 7,395,538 B1 | | 7/2008 | Carney et al. |
| 7,398,471 B1 | | 7/2008 | Rambacher et al. |
| 2001/0053148 A1 | | 12/2001 | Bilic et al. |
| 2002/0039349 A1 | | 4/2002 | Malaney et al. |
| 2003/0143973 A1 | | 7/2003 | Nagy et al. |
| 2005/0198247 A1 | | 9/2005 | Perry et al. |
| 2006/0036719 A1 | | 2/2006 | Bodin et al. |
| 2006/0101159 A1 | | 5/2006 | Yeh et al. |
| 2007/0058540 A1 | * | 3/2007 | Kay .............................. 370/230 |
| 2007/0058632 A1 | | 3/2007 | Back et al. |
| 2008/0028068 A1 | | 1/2008 | Nochta et al. |
| 2010/0214918 A1 | * | 8/2010 | Karunakaran et al. ..... 370/230.1 |

OTHER PUBLICATIONS

U.S. Appl. No. 09/679,321, filed Oct. 3, 2000, Islam et al. (abandoned).

* cited by examiner

*Primary Examiner* — Hassan Kizou
*Assistant Examiner* — Ashil Farahmand
(74) *Attorney, Agent, or Firm* — Pillsbury Winthrop Shaw Pittman LLP (57) ABSTRACT

A system as described herein offers flexible and high-performance packet processing, and a unique scaling technology that matches the resource requirements with the demands of the individual application and operating environment. According to one aspect, the architecture enables wire-speed execution of any Packet Handling application, at any packet size. According to another aspect, the invention provides a general-purpose computing platform that enables Packet Handling applications to be dynamically developed and put into service, for a configurable set of traffic and with configurable amounts of processing power. According to a further aspect, the dynamically scalable architecture of the invention enables the processing power of the appliance to be freely adjusted to the performance requirements of a given application, without requiring any special configuration changes. According to another aspect, the present invention provides an internal traffic management scheme that ensures fair allocation of system resources from network traffic loads and guarantees proper load distribution among the various application processors. According to another aspect, arbitrary numbers of network interfaces and network processors to scale the amount network processing throughput in accordance with the needs of the device and/or managed network(s).

12 Claims, 5 Drawing Sheets

SCALABLE ARCHITECTURE FOR DEEP-PACKET PROCESSING

CROSS-REFERENCE TO RELATED APPLICATIONS

The present application is a continuation of U.S. patent application Ser. No. 11/837,089, filed Aug. 10, 2007, which claims priority to U.S. Provisional Application No. 60/822,008, filed Aug. 10, 2006, the contents of both of which are incorporated herein by reference in its entirety.

FIELD OF THE INVENTION

The present invention relates to computer networks and more particularly to a device for potentially complex processing a scalable amount of traffic in a network with a scalable amount of processing power and a scalable number and type of applications.

BACKGROUND OF THE INVENTION

Performance and flexibility have historically been viewed as opposing goals in network system design. The emergence of Deep Packet Inspection (DPI) software in networking has pushed the struggle to achieve both performance and flexibility in the same system to the forefront of the requirements of next-generation networking. The fundamental building blocks of network application designs are Packet Forwarding and Control. Conventional ASIC-based designs combine Packet Processing and Control into custom hardware, achieving performance at the expense of flexibility, development cost and complexity. At the other end of the conventional design spectrum lie "server"-based approaches, which place Packet Processing and Control on general purpose processors, thereby retaining flexibility, but at the expense of performance.

Commonly-owned patent application Ser. No. 09/679,321, incorporated by reference herein, advanced the state of the art by providing a Programmable Network Server and Device. An aspect of this application is that it provided a platform for performing Packet Processing and Control applications that is dynamically and remotely loadable such that new network service applications can be written and deployed on servers without deploying network personnel to the server location and without interrupting or re-routing traffic that would otherwise pass through the device.

Although the invention of this application solved many conventional problems afflicting network application designs, it would be desirable to extend the principles thereof in new and useful ways.

SUMMARY OF THE INVENTION

The present invention relates to a system that offers flexible and high-performance packet processing, and a unique scaling technology that matches the resource requirements with the demands of the individual application and operating environment. According to one aspect, the architecture enables wire-speed execution of any Deep Packet Inspection application, at any packet size. According to another aspect, the invention provides a general-purpose computing platform that enables Deep Packet Inspection applications to be dynamically developed and put into service, for a configurable set of traffic and with configurable amounts of processing power. According to a further aspect, the dynamically scalable architecture of the invention enables the processing power of the appliance to be freely adjusted to the performance requirements of a given application, without requiring any special configuration changes. According to another aspect, the present invention provides an internal traffic management scheme that ensures fair allocation of system resources from network traffic loads and guarantees proper load distribution among the various application processors. According to another aspect, arbitrary numbers of network interfaces and network processors to scale the amount network processing throughput in accordance with the needs of the device, the application and/or managed network(s).

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present invention enables a scalable and programmable device for providing network services. The device can be configured with arbitrary numbers of application CPUs to scale the amount of application computational power, and arbitrary numbers of network processors to scale the amount network processing throughput, while providing mechanisms for scaling the set of applications that run on the system. This scaling enables the invention to provide wire-speed execution for any Deep Packet Inspection service, at any packet size.

Figure 1:
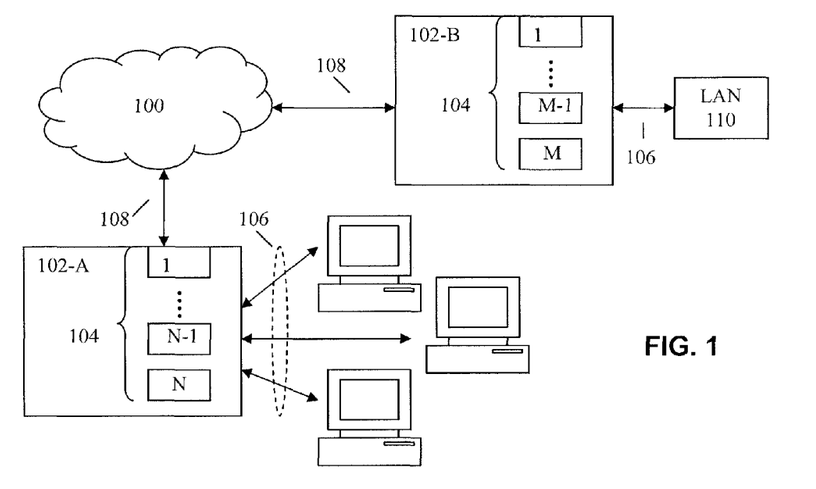
FIG. 1 is a block diagram illustrating an example network environment of the present invention.

FIG. 1 illustrates an example embodiment of the present invention. As shown in FIG. 1, some embodiments of the invention include a programmable network device 102, which may be located at any point within a network or between networks. In some embodiments, the device may be located at a customer, or enterprise premises; in other embodiments, the device may be located at an edge of a service provider network 100. In some embodiments, device 102 may be owned and/or operated by a Service Provider (SP) or carrier connecting the customer, or enterprise, to a Wide Area Network (WAN). The WAN may be an Autonomous System, service provider backbone, or other type of internetwork. Alternatively, the device may be owned/and or operated by the enterprise itself. In some embodiments of the invention, device 102 may be a self-contained unit which resides behind an access router (not shown) and supports IP services to the enterprise. In alternative embodiments, device 102 may be instantiated as, or together with, an access router.

According to certain scalability and other aspects of the invention mentioned above and described in more detail below, device 102 may include two or more physical interfaces 106, 108 for carrying a configurable bandwidth of data. In embodiments, these interfaces 106, 108 may comprise a configurable number of Gigabit Ethernet interfaces; in other embodiments, one or more of the physical interfaces may additionally or alternatively comprise a configurable number of 10 Gigabit Ethernet, 10/100 Ethernet, and/or POS interfaces. Interfaces 106, 108 couple device 102 to the enterprise network 100, either directly or through an access router or the like, as well as to networks such as LAN/WAN 110, endpoints 112, and/or combinations thereof. Although not shown for clarity of the invention, the device 102 may include additional interfaces for management, which may include, but are not limited to a console or modem to a serial port, or a 10/100 Ethernet port.

Moreover, as further shown in FIG. 1 and in accordance with the above and other aspects of the invention, device 102-A may include N processors, while device 102-B may include M processors, depending on the needs of each environment. According to additional aspects described in more detail below, the number of processors in either of device 102-A or 102-B may be dynamically changed at any given time.

Figure 2:
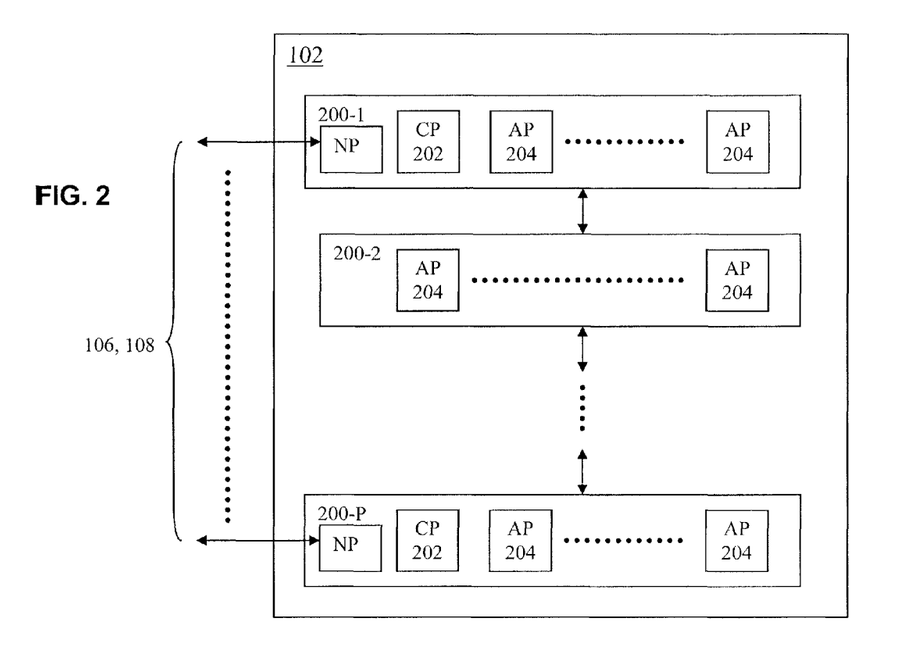
FIG. 2 is a block diagram illustrating an example network device according to the invention.

An example implementation of device 102 is illustrated in FIG. 2. As shown in FIG. 2, device 102 in this example is comprised of a stack of one or more platforms 200-1 to 200-P, each including one or more application processors (APs) 204. Certain platforms 200 can further include a control processor (CP) 202. In this example, platforms 200 that include a CP 202 also support an external interface to external or other networks or devices. The aggregate external interfaces of device 102 supported by CPs 202 correspond to interfaces 106, 108 as shown in FIG. 1. Platforms 200 are stacked via an internal interface described in more detail below. Preferably, at least one platform 200 in device 102 includes a CP 202. In one non-limiting example, device 102 is comprised of a rack and each platform 200 is a 2U rack-mountable device.

As will be explained in more detail below, each CP 202 is responsible for platform and/or system management functions. CPs 202 also run the control programs that manage the platform and/or system. In a preferred implementation, CPs 202 do not run any data-handling applications (such as firewall or IDS) as do APs 204, thereby freeing them to keep system management functions at highest priority. According to some aspects, CPs 202 further adjusts parameters for controlling real-time data path tasks such as traffic management, traffic shaping, packet/data modification, and policing.

In the non-limiting example implementation illustrated in FIG. 2, each platform 200 having a CP 202 also has a network processor (NP) for handling network traffic associated with a respective one of external interfaces 106, 108. Accordingly, network traffic entering the device 102 through the external interfaces 106, 108 is passed to the NPs for packet processing and rewrite. In addition to the packet processing and re-write, NPs implement a number of functions including packet management and statistics gathering, and distribution of flows via load-sharing and other algorithms that will be described in more detail below to the APs 204 on the same and/or other platforms 200.

APs 204 act as the primary host for networking application(s). In one example embodiment, each AP 204 comprises a CPU subsystem, running its own individual Linux execution environment. APs 204 thus provide the processing power for third party applications running on the device 102 and the CPUs therein together correspond to the configurable number of processors in the devices 102 in FIG. 1. More particularly, the present invention recognizes that applications that are particularly CPU intensive may require additional application processing power in order to operate at network speeds, especially at smaller packet sizes. Additionally or alternatively, the number of network processing applications desired for a given device 102 may change.

For adapting to the processing needs of a desired set of applications, the invention offers the application processing scaling feature, which allows platforms 200 having APs 204 to be dynamically added to, or removed from, the stacked device 102 (or APs to be added to or removed from individual platforms 200 in a manner that should become apparent from further descriptions below), to arrive at the desired number of APs 204, and thus the desired amount of processing power.

Just as each stack can be configured with arbitrary numbers of APs 204 to scale the amount of application computational power, arbitrary numbers of NPs can be included to scale the amount network processing throughput in accordance with the particular needs of the configuration. More particularly, platforms 200 that include a NP further incorporate network interface modules (NIMs) supporting a variety of industry standard interfaces that contribute to the overall throughput of interfaces 106, 108. The traffic load can be either shared among all local APs in the platform or copied, forwarded and/or load-balanced to other APs in the system.

NP scaling according to the invention also permits flow cut-through, so that traffic may enter and exit through different platforms including a network processor and/or APs 204 (i.e. traffic need not be forwarded using same platform, for example one platform can receive traffic, another platform can process it, and that platform or still another platform can forward it out). Moreover, the stacked system can use one or more NPs for packet forwarding, while appearing and functioning as a single network device.

According to certain other aspects of the invention, device 102 can include more than one CP 202 for redundancy, while presenting a single management interface. In this case, a "principal" CP is loaded with configuration information, which is duplicated and propagated to the other CPs in the system. Its management interfaces are also preferably the principal management interfaces of the system.

According to additional aspects of the invention, in a device 102 having more than one CP 202, a "primary" CP is a CP in the primary state of a redundant pair or group, and a "secondary" CP is a CP which is acting as secondary/backup in a redundant pair or group. Moreover, the primary CP is loaded with configuration information which is duplicated to the other CPs.

Still further, in addition to the processing power and network throughput scaling aspects described above, aspects of the invention include the ability to dynamically alter the set of network services applications running within the device 102 and/or the types of traffic processed by a given set of applications (for example, the need to add or change one or more anti-virus applications for a given set of network traffic). In one example, the invention includes the ability to specify a set of applications to service a given set of traffic (e.g. a specific anti-virus application for a given subnet of network traffic), as well as to configure the number and identity of APs to run these applications.

Figure 3A:
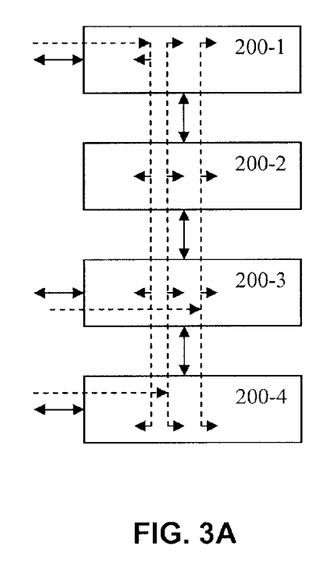
FIG. 3 is a block diagram illustrating certain scalability aspects of the invention.
Figure 3B:
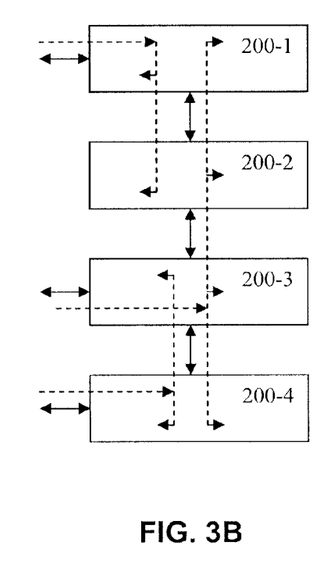

FIGS. 3A and 3B illustrate certain configuration aspects of a dynamically scalable network device according to the invention.

As shown in FIG. 3A, three platforms 200-1, 200-2 and 200-4 include external interfaces, each of which have, for example, a potential bandwidth of 10 Gbps for a total potential network throughput for the stack of 30 Gbps. As further shown, traffic from these interfaces is load-balanced, copied or otherwise broadcast to all four platforms. Suppose, for example, the internal interfaces between platforms only have a bandwidth of 20 Gbps. At any given time, therefore, the total traffic from the external interfaces (i.e. 30 Gbps) could potentially exceed the capacity of the internal interfaces (i.e. 20 Gbps), which could lead to poor performance and loss of reliability, for example.

The invention provides mechanisms for solving this potential problem. According to one aspect, the invention provides an internal traffic management scheme that segments the internal interface between platforms so that inter-platform traffic is only transmitted on necessary segments. According to another aspect, the invention provides a means of configuring the system to manage the number and identity of platforms and/or processors that operate on various types of network traffic.

Accordingly, as shown in FIG. 3B, the system can be configured such that traffic from external interfaces on platform 200-1 only traverses the internal interface between platforms 200-1 and 200-2, and the traffic management scheme ensures that the traffic is not forwarded to any platforms beyond platform 200-2. Similarly, traffic from external interfaces on platform 200-4 is configured to traverse only the segment of the internal interface between platforms 200-3 and 200-4, and the traffic management scheme ensures that the traffic is not forwarded any further than platform 200-3. Meanwhile, traffic from external interfaces of platform 200-3 is configured and allowed to flow to all platforms. In this example, the configuration and traffic management scheme of the invention ensure that the resources of the system are properly utilized.

Figure 4A:
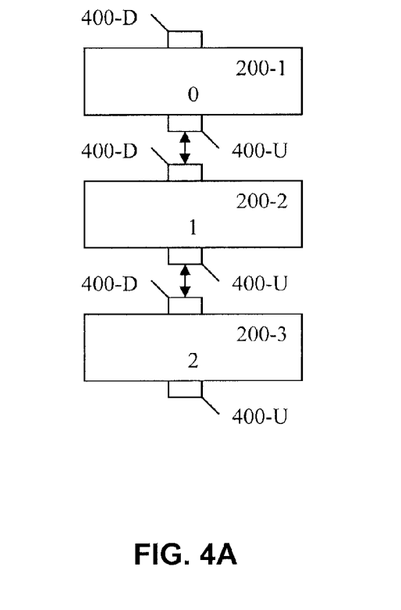
FIG. 4 is a block diagram illustrating certain scalability and configurability aspects of the invention.
Figure 4B:
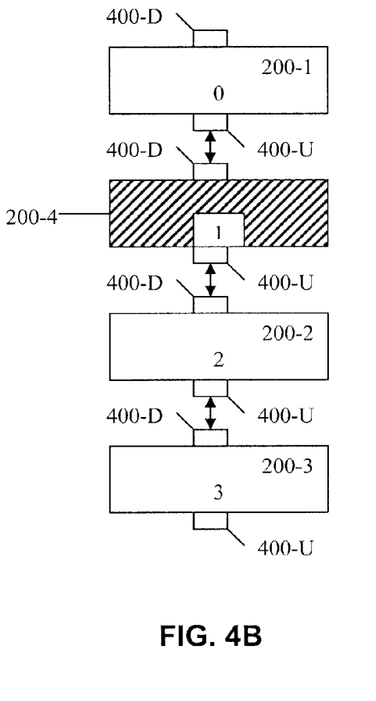

FIGS. 4A and 4B illustrate certain aspects of an example traffic management scheme for a dynamically scalable network device according to the invention.

As shown in FIG. 4A, three platforms 200-1, 200-2 and 200-3 are stacked via an internal interface, for example a 10 Gbps full duplex interface which will be described in more detail below. In this example, each platform includes two separate ports 400-U and 400-D for supporting the internal interface to up to two adjacent platforms.

In addition to forwarding network traffic among and between platforms, the internal interface forwards control packets between platforms. For example, periodically (e.g. once per second), platforms 200 exchange control packets for determining the current number and configuration of platforms in the stack. As a further example, the control packet may include an ID number (for example, an integer between 0 and 100). Each platform expects to receive a control packet from its port 400-U with an ID one higher than its own ID number, and a control packet from its port 400-D with an ID one lower than its own ID number. If that does not occur, additional control packets can then be exchanged to resolve the error and determine the current configuration of platforms in the stack.

Accordingly, in the example of FIG. 4A, platform 200-1 through previous configurations has been determined to have an ID of 0. At predetermined intervals (e.g. 1 second), it sends a control packet on its two ports 400-U and 400-D identifying itself as having an ID of 0. Platform 200-2, which has been previously determined to have an ID of 1, receives the control packet on its port 400-D and verifies that it is correct because the received ID is one less than its ID of 1. In response, platform 200-2 then sends its own control packet on its two ports 400-U and 400-D identifying itself as having an ID of 1. Platforms 200-3 and 200-1 respectively receive this control packet and verify that it is correct. The process continues with platfoiin 200-3 sending its own control packet on its two ports 400-U and 400-D, and platform 200-2 verifying this is correct. The process completes with each platform verifying the control packets it received were correct, and platforms 200-1 and 200-3 determining that no packets were received from its ports 400-D and 400-U, respectively. Accordingly, no re-configuration of the stack has occurred and there is no need to update or change the IDs of the platforms and/or perform other updates and re-configurations.

In the example of FIG. 4B, a new platform 200-4 is added to the stack between platforms 200-1 and 200-2. Thereafter, when platform 200-1 sends a control packet on its port 400-U, platform 200-4, which receives the control packet on its port 400-D, determines that it must have an ID of 1, and sends a corresponding control packet on its ports 400-D and 400-U to platforms 200-1 and 200-2 respectively. Platform 200-2 receives this control packet on its port 400-D and determines an error condition because the received ID and its own ID are the same. In one example, it signals this error by creating an error control packet which is propagated to the platform having the ID of 0, i.e. platform 200-1. In this example, platform 200-1 initiates a series of control packets to determine the new configuration and cause platforms 200-2 and 200-3 to update their IDs to 2 and 3 respectively. Additional configuration updates and modifications can also be performed, such as updating tables that map APs to platforms, etc. This and other additional configurations will become apparent from descriptions below.

As mentioned above, an aspect of the invention is the ability to configure distribution of network traffic between and among platforms 200 in a stack, as well as to configure the servicing of network traffic by individual CPUs in APs 204 contained in the platforms 200 of the stack, and further to configure the applications running on such CPUs.

In one example, such configuration is accomplished through configuration inspection groups (CIGs) that are defined by an administrator and stored in a configurations file associated with one or more of the CPs 202 of the stack. In one non-limiting example, an inspection group is a collection of one or more CPUs/APs that is pre-allocated to run a specific application. Using these inspection groups, it is possible to segment the processor resources in the system in such a way that multiple applications can run simultaneously on separate CPUs within the same base chassis. Each application can then view all traffic (or a pre-defined subset) and manage it appropriately. An example implementation of CIGs that can be used in accordance with the principles of the invention is described in more detail in U.S. Pat. No. 7,895,331 (BIV-002), the contents of which are incorporated herein by reference.

TABLE 1 illustrates one possible example of inspections groups and how CPUs can be assigned to the group. In particular, the CPU listing indicates which inspection group contains which CPUs, as well as the physical hardware location of each CPU (i.e. which APC in the stack and in which slot of the APC).

TABLE 1

| Inspection Group | CPU Name | CPU Location |
| --- | --- | --- |
| lab-ig1 | CPU-1 | Slot 0/Unit 2 |
|  | CPU-2 | Slot 0/Unit 3 |
| lab-ig2 | CPU-3 | Slot 1/Unit 0 |
|  | CPU-4 | Slot 1/Unit 1 |
| mfg-ig | CPU-5 | Slot 1/Unit 2 |
|  | CPU-6 | Slot 1/Unit 3 |

It should be apparent that when there are multiple platforms 200 in a stack, the CPU location can further include the platform ID. It should be further noted that the CPU location can be derived manually or automatically through a number of mechanisms apparent to those skilled in the art based on the present disclosure.

According to additional aspects, CIGs allow an administrator to bind specific interfaces to classification policies and distribute incoming traffic to the assigned computational resources according to the classification. The device can also be configured to bind multiple interfaces in the mixture of inline and sniff modes to a group of CPUs. In sniff mode, traffic coming in the associated interfaces can be configured to pass directly through the network layer of the device with minimal latency while sending a copy of the packet to the appropriate Inspection Group(s). Different applications or configurations can be run on different groups or sub groups of CPUs allowing complete flexibility. With the built-in hardware broadcast capability, packets can be duplicated in hardware for broadcast to multiple CPUs without penalty to system throughput or packet latency.

Traffic sets indicate which how various types of traffic will be handled, the interfaces belonging to each inspection group, and the status of each group. An example of how traffic sets can be defined is set forth in TABLE 2 below.

TABLE 2

| Name | Interfaces | Traffic Classes |
| --- | --- | --- |
| lab | s0.e0, s1.e0 | lab-ip, lab-errors, lab-other |
| mfg | s0.e2, s0.e3 | mfg-ip, mfg-arp, mfg-IPv6, mfg-other |
| default | s0.e1, s1.e1 | default-drop |

Figures 5, 6:
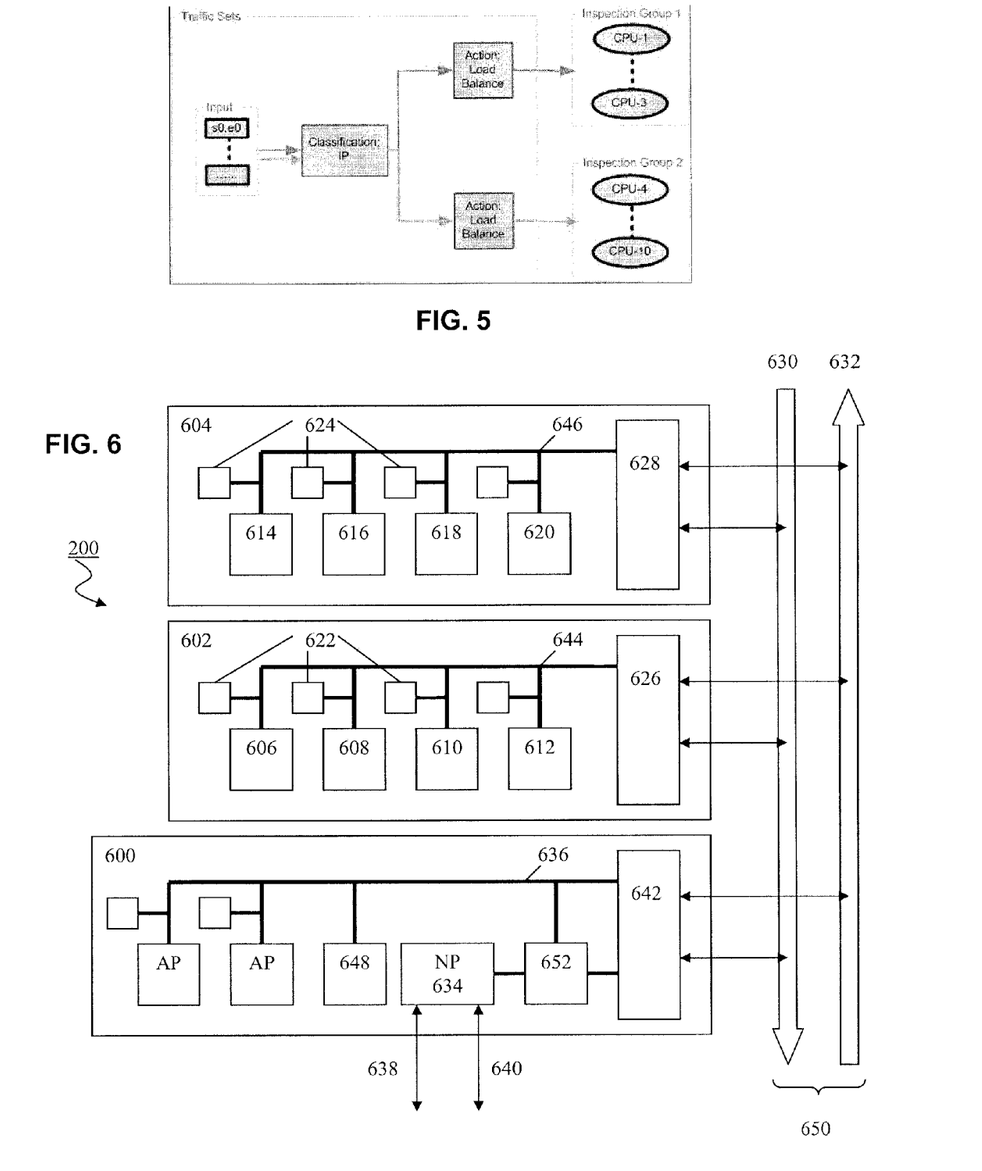
FIG. 5 is a block diagram illustrating certain configurability aspects of the invention.
FIG. 6 illustrates an example hardware architecture according to certain aspects of the invention.

FIG. 5 illustrates one possible example of how CIGs can be used to configure the handling of various sets of network traffic. In the illustrated example below, IP traffic is classified into two groups which are then load balanced among a dedicated Inspection Group, or group of CPUs. Different applications or configurations can be run on different Inspection Groups, allowing complete flexibility in applying the platforms resources to different tasks.

An example of a scalable hardware architecture that can be used by embodiments of the invention to implement the device 102 shown in FIGS. 2 through 4 is illustrated in more detail in FIG. 6. Although FIG. 6 illustrates an example of device 102 having only one platform 200, it should be apparent that from the foregoing descriptions that there can be several platforms in a device 102, some or all of which may provide external interfaces, network processors and/or control processors as described in more detail below.

As shown in FIG. 6, in this example implementation, a platform 200 includes one or more Application Processor Cards, (APCs) 602 and 604, each APC including several APs 606-620 that can respectively correspond to APs 604 in FIG. 2, each AP having a "slot" location on internal buses 644 and 646. In embodiments, these APs 606-620 may be each be comprised of a general purpose CPU, such as processors from the Intel Pentium™ family, the Power PC™ series, or those offered by Transmeta™ Inc; alternative CPUs will be apparent to those skilled in the art. Core network services and management applications are executed on the APs 606-620 resident on APCs 602 and 604.

In embodiments of the invention, an APC may include one or more encryption processors 622 and 624 to perform encryption services for the APs 606-620. These encryption services may include, but are not limited to Diffie-Hellman operations, RSA signatures, RSA verifications, etc. In embodiments, each AP 606-620 in APCs 602 and 604 has its own encryption processor 622 and 624. Examples of commercial encryption processors that may be utilized include the HiFn 6500 and the Broadcom BCM 5820. Alternative security processors will be apparent to those skilled in the art.

In some platforms 200 such as that shown in FIG. 6, a CP 202 such as that illustrated in FIG. 2 is included and implemented by certain portions of a Network Processor Card (NPC) 600 as depicted in FIG. 6. As noted above, however, some platforms 200 may not include a CP 202. When included in a platform 200, NPC 600 may further include one or more network processors to perform functions on inbound and outbound packet flows. For example, as illustrated in FIG. 6, NPC 600 may include a network processor 634 to handle outbound 638 and inbound 640 traffic. In particular, an inbound PHY interface 640 and an outbound PHY interface 638 may both interact with Gigabit Ethernet ports. Examples of a suitable network processor 634 include the RMI XLR732, Intel™ IXP Chip, the Agere family of Network Processors, and Motorola Inc.'s C-Port network processor; other suitable network processors will be apparent to those skilled in the art. Alternatively, a special purpose ASIC or FPGA may be used to support functions on traffic flows.

NPC 600 may also contain one or more controller CPUs shown as controller CPU 626 for controlling and managing the network processor 634. The controller CPUs may also be comprised of general purpose CPUs. NPC 600 may also contain APs that couple to bus 636 and operate similarly as APs 606-620.

In embodiments, each APC 602, 604 and NPC 600 also includes a switch 626, 628 and 642, respectively, allowing APs 606-620 and controller CPU 652 to communicate with bus 650 of the device. In embodiments, the bus 650 may be comprised of two or more unidirectional buses, including an uplink 632 and a downlink 630. The uplink and downlink each operate at data rates of 10 Gbps or higher. In embodiments, the uplink and downlink operate by use of Low Voltage Differential Signaling, or LVDS.

In embodiments of the invention, the switches 626 and 628 may comprise customized ASICs; in other embodiments, the switches may be implemented on FPGAs. Examples of FPGAs that may be used for the switch include those produced by Xilinx™, Inc. or Lattice Semiconductor. Alternative FPGAs will be apparent to those skilled in the art.

Figure 7:
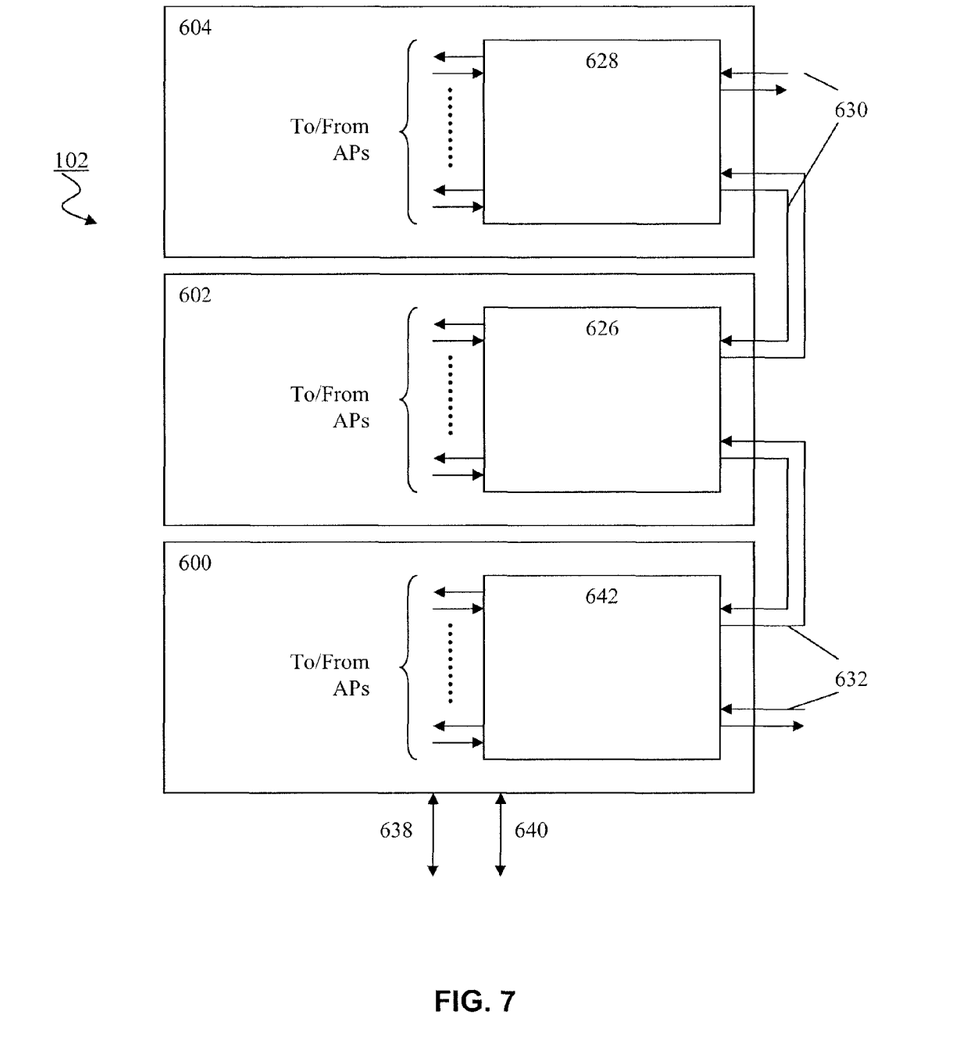
FIG. 7 is a block diagram illustrating certain additional aspects of an architecture such as that shown in FIG. 6.

FIG. 7 illustrates one possible implementation of high speed bus 650. In this example, each platform 600, 602, 604 is included in its own rack-mountable chassis designed for inclusion in a standard carrier rack which is NEBS compliant. Each switch 628, 626, 642 supports two downlinks 630 and two uplinks 632 that each facilitate uni-directional communication between adjacent platforms. In one example, the links 630, 632 are implemented using 16-wire cables carrying LVDS signals each operating at about 622 Mbits/sec. In other embodiments, SerDes technology may be used. As further shown, each switch 628, 626, 642 also supports respective uni-directional signaling with the APs in the platform.

Although device 102 in the example of FIG. 7 is comprised of a single rack, and platforms are each comprised of a rack-mountable chassis, it should be apparent that device 102 can be comprised of several racks and/or platforms that are co-located or remotely located. In such configurations, bus 650 may further include network links such as Ethernet.

Moreover, bus 650 in some examples can comprise both a control and data backplane for the device 102. However, in other embodiments of device 102, there can be separate control and data backplanes, for example with a control plane comprised of Gigabit Ethernet, and the data plane comprised of a 20 Gigabit signaling system.

Returning to FIG. 6, the platform 200 includes an internal communications bus comprised by internal buses 636, 644 and 646, switches 626, 628 and 642, and the bus 650. In embodiments of the invention, the local buses 644, 646 and 636 within NPC 600 and APCs 602, 604 respectively may be comprised of PCI buses; alternative implementations of the local buses will be apparent to those skilled in the art.

As set forth above, platform 200 may include one or more processors 634 for packet forwarding comprised of, by way of non-limiting example, general purpose CPUs, customized ASICs, or network processors. API calls to these processors 634 may include, by way of non-limiting example, calls that set filters, add and remove tree elements, etc. In embodiments of the invention, such software resides on the controller CPU 652. In such embodiments, the API is extended to applications on other APs 606-620 by use of a Multi-CPU Communication Protocol, described in more detail below. In embodiments, the API may also be used to read statistics from the network processor 634.

In embodiments of the invention, network processor 634 is comprised of a set of micro-coded engines or a general purpose processor and associated code. In embodiments, the code for these processors is stored in a local file system, and is downloaded from a remote server. In embodiments, the remote server is coupled to device 102 via an internetwork. In some embodiments, the code determines which applications are executed on the platform and/or some or all of the other platforms of the device, as well the sequence in which they are run. The code may also provide hooks whereby new applications can filter out packets and re-insert them into the data stream.

In embodiments of the invention, encryption/decryption/key generation engines 622 and 624 are attached to one or more of the application APs 606-620. Alternatively, the functionality of one or more of such engines can be incorporated in NPs. A driver for these engines makes these functions available in user and kernel space. In embodiments, a compression/decompression engine is additionally attached to one or more of the application APs 606-620 and/or included in engines 622 and 624. In some such embodiments, the driver for these engines makes these functions available in user and kernel space It should be noted that such encryption and compression functionality can be alternatively embodied by software executed on APs 606-620.

Embodiments of device 102 include a file system contained in a flash memory in, or hard drive 648 attached to NPC 600. In embodiments of the invention, the file system may be based on a Unix/Linux file; in other embodiments, the file system may be based on a DOS/Windows File Allocation Table. Alternative file systems will be apparent to those skilled in the art. In embodiments, file system includes configuration files (including for example CIGs specifications), application and OS binaries, shared libraries, etc. In embodiments of the invention, the file system is directly accessible by the controller CPU 626. In embodiments of the invention, the controller CPU 626 exports some or all of the file system to the APs 606-620, which may mount the file system as part of diskless operation.

In one preferred embodiment, APs 606-620 and controller CPU 652 all run a standard Linux execution environment for rapid integration of "off-the-shelf" Linux Packet Handling applications. In this embodiment, the installed operating system loaded onto each processor consists of a collection of individual RPMs. RPMs may be added or removed from the system at any time during the operational life of the operating system. All application software is compiled for the Linux PowerPC architecture. In one example, the installed operating system includes Linux kernel 2.4, 2.6 or future versions from www.kernel.org with modifications to support the platform architecture. Security patches from the Linux community are preferably applied to this kernel as soon as vulnerabilities are discovered.

In embodiments of the invention, once the controller CPU 652 and other APs 606-620 are loaded with their operating systems, a number of manager/server applications are started. They may be started on any AP 606-620 in the system. Non-limiting examples of the standard services may include file servers, telnet servers, console I/O, etc. These services can be implemented by techniques well known to those skilled in the art. Other services may include one or more of the following: Name Server, Programmable Network Device Manager, CPU Manager, and Statistics Manager. These services are described in more detail below In embodiments of the invention, every application program in the platform and/or device offering a service registers with the Name Server. The Name Server maintains a Name Registry containing information which may include the application's name, version, and a local address where it can be reached by other applications. The Name Registry itself is available at a well-known address, and runs on the controller CPU 652 after it boots up.

Embodiments of the invention include a Programmable Network Device Manager (PND Manager) which is used to start all applications other than those that are part of the infrastructure. The PND Manager, which may run on the controller CPU 652 and/or network processor 634, reads the configuration information (including, for example, CIGs information), and starts applications on various CPUs. In embodiments, the PND performs this function in conjunction with a CPU Manager, which has instances running on the other APs 606-622. In some embodiments of the invention, the CPU Manager runs in every application AP 606-622 of the platform and/or device. In embodiments of the invention, the PND Manager balances load based on the loading of CPUs as measured by the CPU Manager; alternatively, the PND Manager may select a fixed CPU for an application based on its configuration. When an application is started up, the CPU Manager allocates CPU resources for a given application, such as, by way of non-limiting example, the application's priority or real-time quota. In embodiments of the invention, the CPU manager starts up in a CPU as soon as it boots up, and has a well-known address.

In embodiments of the invention, applications periodically make their statistics available to a statistics manager. The statistics manager may run on any CPU in the platform. The Statistics Manager can be queried by management applications through an API. In embodiments of the invention, the Statistics Manager registers with the Name Registry, so applications will be able to locate it by querying the Name Registry.

In embodiments of the invention, all of the APs 606-620 include identical operating system kernels, such as Linux kernel 2.4.17 as described above. Moreover, the APs 606-620 run core network services and network management applications. Non-limiting examples of core applications may include Firewall, Network Address Translation (NAT), IPSEC/VPN, Layer 2 Tunneling Protocol (L2TP), Routing, Quality of Service (QoS), Multi Protocol Label Switching (MPLS), IP Multicast; other examples of core applications will be apparent to those skilled in the art. In embodiments of the invention, core applications are allocated relatively larger ratios of CPU resources for meeting perfoimance goals, while management applications are allocated a relatively smaller, pre-defined percentage of a CPU. In some such embodiments, this pre-defined percentage may be on or about 5% of CPU resources. All of the management applications preferably share this allocation. If core applications do not use the CPU resources allocated to them, these CPU resources will be available for management applications.

In embodiments of the invention, both core and management applications can be loaded dynamically, using mechanisms such as that described in co-pending application Ser. No. 09/679,321 for example. While core applications may have driver components loaded into the kernel, in embodiments of the invention, management applications do not have driver components.

In embodiments of the invention, the controller CPU 652 controls the startup of all of the sub-systems in the platform and/or device. In some embodiments of the invention, CPU 652 includes a flash memory unit and/or a hard disk such as drive 648 which store the operating system and application binaries for all of the APs 606-620, along with any configuration information. In embodiments of the invention, the controller CPU 652 also includes a management interface. This interface can be implemented by a serial port for attachment of a console, modem, and/or an Ethernet port, such as a 10/100/1000 Mbit/s Ethernet port, and/or a USB or other type of interface. The controller CPU 652 may also support telnet/console sessions. In embodiments of the invention, the application APs 606-620 mount their file systems from the controller CPU 652, and will see the same files as any application running on the controller CPU 652.

In the environment of the platform and/or device, applications may be started and stopped frequently as the carrier, ISP, or enterprise can deploy services dynamically. As described in more detail in the co-pending applications incorporated by reference herein, embodiments of the invention include a secure protocol between the device 102 and a separate server for loading applications and configuration information. Also, when an application exits, the OS and system applications may perform cleanup. In those embodiments of the device 102 employing Linux, the Linux operating system provides the basic mechanisms for loading and unloading applications and drivers in a CPU. Every application has its own virtual address space in the Linux environment, so they will not corrupt other applications.

In addition to the unique and novel mechanisms described in the co-pending application, the mechanisms for remotely loading applications from a server can include standard techniques known in the art. For example, in embodiments of the invention, a secure version of FTP may be used to download applications and configuration files from servers into flash memory. Administration may be performed through a secure connection such as Secure CRT. Through this secure connection, applications and drivers can be loaded and unloaded dynamically. In embodiments of the invention, prior to loading an application or driver, the application or driver is downloaded into flash memory.

Embodiments of the invention include a Multi-CPU Communication Protocol, or MCCP, comprising a link level protocol for communication between processors in the device 102. In embodiments of the invention, MCCP is a connectionless service. MCCP addresses uniquely identify each processor in device 102. Above the link level, the MCCP may carry multiple protocols. In embodiments of the invention, the MCCP protocol header identifies the actual protocol, which may be, for example, UDP or TCP. For the purposes of MCCP, the network processors 634 are treated as special CPUs.

In embodiments of the invention, all communications between processors in the device utilize MCCP. As part of initialization, every processor discovers its address and location in a device hierarchy (e.g. APC, slot within platform and platform ID), including all processors in different platforms of a stack. In some such embodiments, each processor in the device 102 obtains a unique MCCP address for itself. In embodiments of the invention, the MCCP address serves as the equivalent of a physical address in the stacking bus.

Figure 8:
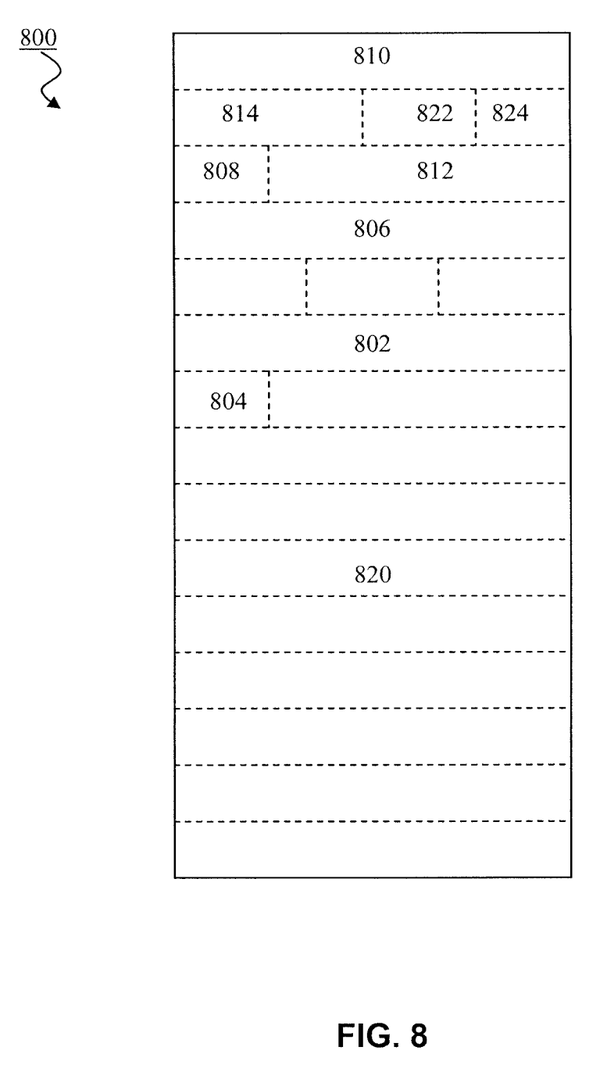
FIG. 8 illustrates an example communication protocol according to aspects of the invention.

An example embodiment of the MCCP includes packets with a format as illustrated in FIG. 8. The packets may originate from any of the processors in the device, including APs 606-620, the controller CPU 652, or network processor 634.

Embodiments of the protocol include a protocol header 800 as illustrated in FIG. 8. The header may include one or more fields indicating a Source Slot Number 802. In embodiments of the invention, the Source Slot Number 802 may refer to the location of a CPU within a particular card and/or platform (e.g. APC or NPC) in a stack of platforms. In some embodiments, the header may include a Source CPU Number 804, which indicates an identification number for a source CPU (e.g. AP, controller CPU or network processor) within the particular processor card. The Source CPU Number 804 indicates the CPU which originates the MCCP packet.

Embodiments of the invention include a Destination Box number 806; in some embodiments, this field indicates an identifier for a particular card (e.g. APC or NPC) and/or platform in a stack and/or device. This processor card contains the CPU which is the intended destination for the MCCP packet. A Destination CPU Field 808 identifies a CPU within the processor card (e.g. APC or NPC) to which the MCCP packet is directed.

In embodiments of the invention, the MCCP packet may also include one or more of the following fields:

A Start of Packet field 810 indicating the start of an MCCP Packet 800. In embodiments, this is a constant field, which may be a palindrome such as $5A_{16}$ One or more fields 812 814 indicating packet length. In embodiments, one field may indicate least significant bits 814 and another may indicate most significant bits 812

In embodiments, an MCCP packet 800 may include several bytes for payload 820

A DMA field 822, which indicates a DMA that may be used to send the MCCP packet 800 to the destination CPU. In embodiments, the DMA field 822 is used by the backplane switch 626, 628, 642—which may be an FPGA or ASIC—to determine which of several DMAs to use.

A Stacked Bus Packet Identifier field (SPI) 824 for indicating a type of packet. For instance, in embodiments, values of the SPI 824 may indicate that the MCCP packet 800 is one of the following:
 i. A Box Numbering used at startup to inform a particular processor of its number within the respective line card and/or respective platform
 ii. A CPU reset used to reset a CPU
 iii. A CPU un-reset to un-reset a CPU According to aspects of the invention, APs 606-620, the controller CPU 652, and the network processor 634 are treated as separate network nodes with individual unique addresses; in some embodiments, these unique addresses may comprise IP addresses. In some such embodiments, the device 102 acts as a network of CPUs coupled by a high speed bus. The stack bus 650 acts as a private LAN running at multi-gigabit rates. Thus the unique addresses used by the different CPUs 606-620, 626 and the network processor 634 are all private addresses within the device 102 and are not sent over the public—i.e., non-management—interfaces.

In embodiments of the invention, communications within the device 102 are based on POSIX sockets, the API to which is available on every CPU. In embodiments of the invention, only the controller CPU 652 is directly coupled to the network interfaces of the device 102. Internally, all processors can communicate with each other directly. In embodiments of the invention, by default, any process that communicates with external entities resides on the controller CPU 652, which has external interfaces and public IP addresses APs 606-620 may run applications that communicate with networks external to the device 102. Non-limiting examples of such applications include IPSEC, NAT, Firewall, etc. Moreover, such applications may be distributed across several APs 606-620 for load sharing or redundancy purposes.

In embodiments of the invention, the private address assigned to the processors 606-620, 652 and 634 are supplemented with virtual interfaces in every CPU corresponding to each external interface of the device 102. The interface address is identical to the public address assigned to the external interface. When an application binds a 'listening' socket to a port and specifies the default IP address, the application will receive all packets addressed to this port, provided the CPU receives the packet. If an application is to receive packets from an external network coupled to the device 102, the application binds to the public IP addresses explicitly. In embodiments, an extended bind command may be used to facilitate this. In some such embodiments, the parameters for the extended bind command are identical to the standard bind command, and a protocol is used to register the bind parameters with the network processor 634. This protocol facilitates communication between the application performing the bind operation, and the controller CPU 652. When a packet satisfying the specified bind parameters is received by the network processor 634, the network processor 634 places an appropriate MCCP MAC header on the packet and forwards it to the CPU running the application.

While features described above enable the operation of common networking applications, embodiments of the invention also include additional techniques enabling applications to register for and redirect packets. Such techniques may be supported by calls which act as a high-level interface to the network processor 634. In embodiments, one such call allows applications to specify a mask that is used to redirect incoming packets to a particular CPU. Such calls may be employed by applications such as, by way of non-limiting example, IPSEC. In embodiments, another call may allow applications to specify a mask, a CPU, and a UDP destination port number. If an incoming packet matches this mask, the packet is encapsulated in a UDP packet with the specified destination port and sent to the specified CPU. By way of non-limiting example, such calls may be used by applications that serve as proxy servers or which perform content based filtering.

In some embodiments of the invention, each application may register a command line interface. The command line is accessible through any console interface, such as a serial console, modem, or a telnet session. Other suitable console interfaces shall be apparent to those skilled in the art.

In embodiments, the device environment provides applications with facilities to share load between different APs 606-620. For example, the APs 606-620 can be identical with respect to running applications, whether or not the CPU is on the same platform, on the NPC, or in one of the other stacked platforms. In some such embodiments, applications may be unaware of the CPU in which they are running In some embodiments, when multiple instances of an application share load, they communicate by use of higher-level protocols running over the Multi CPU Communication Protocol. The CPU manager may be used to determine the load on a particular CPU, and the resources (such as memory) available on a CPU.

In embodiments of the invention, if there are multiple instances of an application registered with the name server for load sharing purposes using the same name, the name server, when queried, returns the addresses of each instance in round robin fashion. Other methods of returning addresses will be apparent to those skilled in the art. Thus, by way of an illustrative, non-limiting example, user sessions can be divided between multiple instances of an L2TP application.

In embodiments, the exact mechanism used for load sharing may differ for each type of application. For inherently stateless applications, each request can be directed independently, to a different application instance. For applications that maintain state for each request, subsequent requests belonging to the same session may be directed to the same instance of the application. In some embodiments, these decisions are made by a forwarding engine, which selects the appropriate CPU for a packet or flow.

Embodiments of the device 102 include measures supporting recovery from software or hardware failures. For example, if a CPU or CPU card fails, the applications that were running on that CPU may be restarted on another CPU. The forwarding hardware can continue forwarding data even if applications fail, to preserve communication between networks coupled via the device 102, and to continue existing sessions.

In embodiments, the device 102 also offers additional facilities for supporting redundancy and failover. One service restarts applications that have failed by use of an application manager. Some transaction services (using two-phase commit for example) may be supported. In embodiments, applications are executed in their own memory space in order to maintain isolation between applications and thereby increase reliability. Embodiments of the programmable network environment also offer support for hot-swapping cards in order to replace failed cards with functional ones.

In embodiments of the invention, data flowing through the programmable network device may include one or more of the following types of traffic, which may processed as follows:

Statically determined flows (i.e. flows not to the system or application based on predetermined criteria). These may include:

i. Flows that are blocked at the input port, or dropped at the output port. For example, these flows may be inferred directly from a firewall configuration.

ii. Flows that are directed to particular APs. For example, the configuration files (e.g. CIGS) may specify that an application is to be run on certain APs. Alternatively, an application may make this known dynamically. In both of these cases, the traffic for that application is directed to the appropriate CPU from the input interface.

iii. Flows passing through the device. These flows may be processed entirely by the network processor, such that the packet is transmitted over an appropriate interface without further manipulation of the packet.

Dynamically determined flows. For example, initially such flows are processed completely in the receiving platform, as no knowledge of the flow is contained in the network processor at the outset. The network processor is eventually configured by the controller CPU to recognize the flow, or the network processor by itself recognizes the flow based on predetermined criteria, so that subsequent packets in the flow are handled entirely by the network processor. As an example, the first packet in such flows may comprise a SYN packet (for TCP connections) without the ACK bit set. An application such as NAT or Firewall processes the packet and forwards it to the eventual destination. When the response is received, a connection tracking mechanism in the OS notes that the flow (or session) has been established, and invokes an API call to transfer this flow to the network processor. The API call in the network processor includes information enabling the network processor to forward packets for the session without involving the controller CPU. Eventually, when a session-ending packet (such as FIN) is received, it is sent to the appropriate AP, and the CPU invokes an API to remove the session from the network processor.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A device, comprising:

a first number of network processors coupled to a network for receiving network traffic;

a second number of application processors that are each adapted to perform deep-packet processing on the network traffic received by the one or more network processor, a configuration table that identifies a first group of the application processors for handling network traffic having a first attribute, and identifies a second different group of the application processors for handling network traffic having a second different attribute, wherein at least one of the first or second groups includes a plurality of application processors;

an interface that allows an administrator to change the identities of the first and second groups of processors in the configuration table, thereby dynamically changing handling of network traffic having the first and second different attributes by the device;

a control processor coupled to a primary one of the network processors, wherein the control processor receives the configuration table and thereby causes the network processors to forward the received network traffic to the application processors in accordance with the configuration table; and a communication protocol signal exchanged between the application processors to control deep-packet processing on the network traffic.

2. A device according to claim 1, wherein the control processor further causes the network processors to forward the received network traffic to the application processors in accordance with a load balancing algorithm.

3. A device according to claim 1, further comprising a signaling mechanism that automatically determines one or both of the first and second numbers.

4. A device according to claim 3, wherein in response to an automatic determination of the second number of application processors, the control processor further causes the network processor to identify the application processors in the first and second groups and to forward the received network traffic to the application processors in accordance with the identification.

5. A device according to claim 1, further comprising a stack of one or more platforms, the application processors being distributed among the one or more platforms.

6. A device according to claim 5, wherein one or both of the first and second numbers is determined by the number of platforms provided in the stack.

7. A device according to claim 6, further comprising a signaling mechanism that automatically determines one or both of the first and second numbers by automatically detecting the number and location of the number of platforms in the stack.

8. A device according to claim 5, wherein the network processors are distributed among certain of the platforms.

9. A device according to claim 1, wherein the first and second groups of application processors are exclusively configured with first and second different application programs, respectively, for handling the network traffic with the first and second different attributes, such that the first group of application processors is not configured with the second application program, and the second group of application processors is not configured with the first application program.

10. A device according to claim 9, further comprising a mechanism for loading the first and second different application programs onto the first and second groups of application processors.

11. A device according to claim 1, wherein the first and second different attributes comprise first and second different network traffic classes.

12. A device according to claim 11, wherein the interface further allows the administrator to dynamically change a type of application program for processing network traffic having one or both of the first and second different network traffic classes.

* * * * *